United States Patent [19]
Tokuda et al.

[11] 4,365,878
[45] Dec. 28, 1982

[54] SIGNAL PROCESSING CIRCUITRY FOR A DISTANCE MEASURING SYSTEM

[75] Inventors: Ryuji Tokuda, Tokyo, Japan; Bernhard H. Andresen, Dallas, Tex.

[73] Assignees: Canon, Inc., Tokyo, Japan; Texas Instruments Incorporated, Dallas, Tex.

[21] Appl. No.: 286,010

[22] Filed: May 1, 1981

Related U.S. Application Data

[63] Continuation of Ser. No. 94,418, Nov. 15, 1979, Pat. No. 4,300,824.

[51] Int. Cl.³ .............................................. G03B 3/10
[52] U.S. Cl. ..................................................... 354/25
[58] Field of Search ......................... 354/25; 352/140; 355/56; 250/201, 204

[56] References Cited

U.S. PATENT DOCUMENTS
4,104,650  8/1978  Hosoe et al. .......................... 354/25

*Primary Examiner*—Michael L. Gellner
*Attorney, Agent, or Firm*—Toren, McGeady & Stanger

[57] ABSTRACT

For a distance measuring system in which a light measuring arrangement responds to changes in light to establish distances, a processing circuit includes a quasi-compression device that receives the electrical signal from the light measuring arrangement and maintains the normal gain of an amplifier to amplify the electrical signal when the electrical signal is low. The compression device reduces the amplifier gain when the electrical signal is higher. This narrows the dynamic range necessary for the distance measuring system.

9 Claims, 7 Drawing Figures

SIGNAL PROCESSING CIRCUITRY FOR A DISTANCE MEASURING SYSTEM

This is a continuation of application Ser. No. 094,418 filed Nov. 15, 1979, now U.S. Pat. No. 4,300,824.

BACKGROUND OF THE INVENTION

1. Field of the Invention

The present invention relates to a signal processing circuitry for a distance measuring system.

2. Description of the Prior Art

Various kinds of devices for measuring a distance to the object have been proposed.

Such distance measuring devices can be roughly classified into two types, so called passive system and active system. The former system measures the distance by receiving the light from an object without projecting any illumination beam and converting the light into an electrical signal so as to detect the maximum value which corresponds to the distance to the object, while the latter projects a light beam to an object and detects the maximum value of reflected light from the object through an electrical means.

In the latter active system, the incident light amount upon the distance measuring device reflected on the object has very wide range when supposed that the objects to be measured lie at 0.8 to 8 meters with the reflection coefficient of 10 to 100 (%). Namely, the incident light amount is proportional to the reflection coefficient and the inverse-square of the distance so that it varies by 1000 times $[=(8/0.8)^2 \times 100/10]$, which means the maximum signal reaches as high as 10 (v) supposed that the minimum is 10 (mv) in the active system if the processing circuitry has unity gain.

Even in case of the above mentioned passive system, the variation range of the ambient brightness of the object is, as is well known, more or less equal to that of the case of the active system, so that the input signal reaches as high as 10 (v), in case the minimum signal is 10 (mv).

Consequently, the conventional active and passive distance measuring system should include the circuitry with a very wide dynamic range to process the light-information so that the circuitry requires a high voltage source, which is large and inconvenient for a small optical instrument.

Although a method of compressing input signal has been proposed in order to narrow the dynamic range, whereby if this method is adopted in a distance measuring device so as to compress the input signal uniformly, the input signal corresponding to the light reflected from an object at a long distance is compressed in the same way as that from an object at a short distance so that especially the detecting accuracy, in other words, the distance measuring accuracy of the object at a long distance is remarkably lowered, which is also very inconvenient.

Consequently, these methods cannot be applied to the distance measuring device and, therefore, it is much required that a method to narrow the dynamic range suited for the distance measuring device should appear.

SUMMARY OF THE INVENTION

It is an object of the present invention to provide a signal processing circuitry capable of narrowing the dynamic range suited for the distance measuring system.

DETAILED DESCRIPTION OF THE INVENTION

Figure 1:
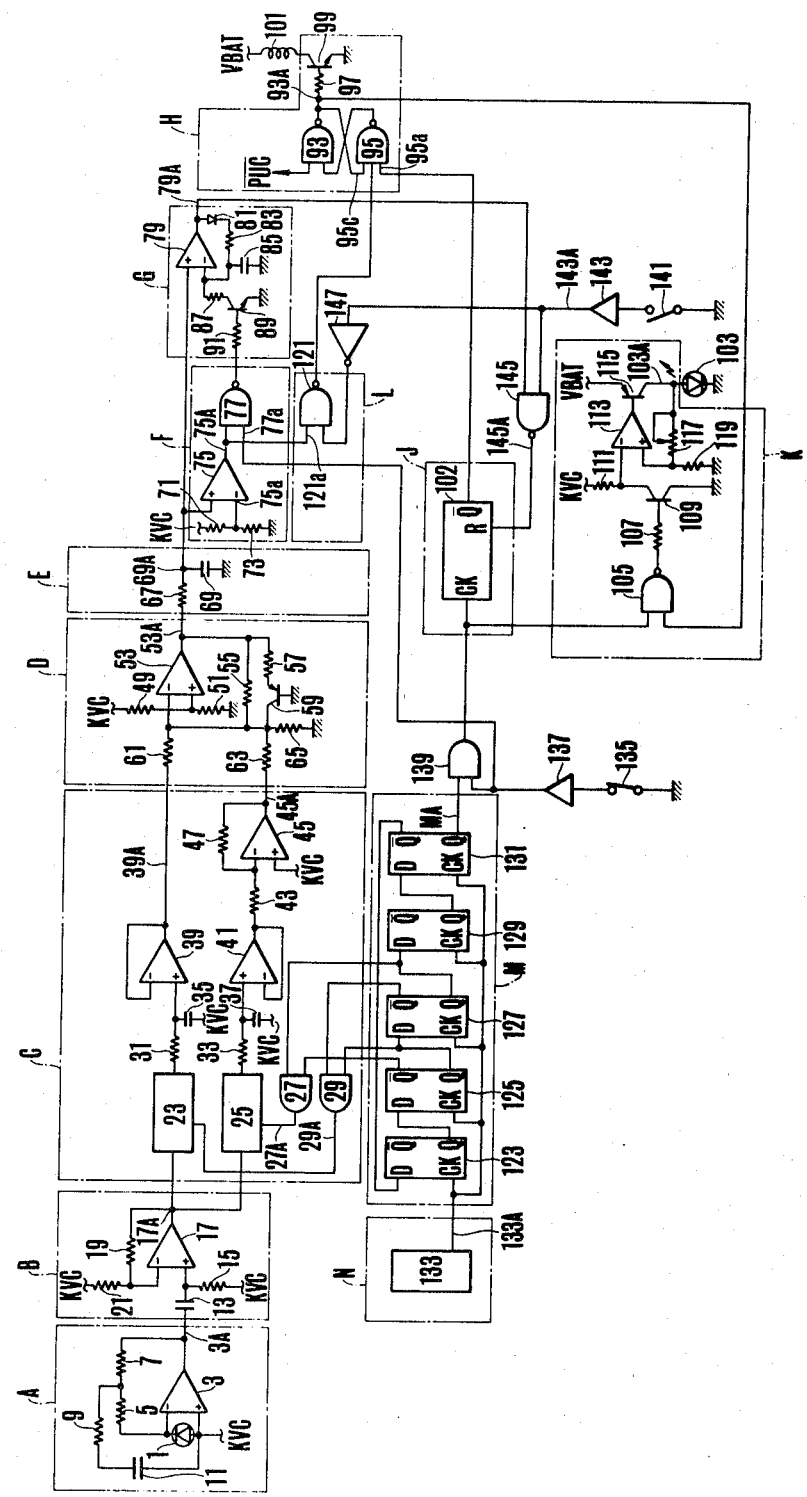
FIG. 1 shows an electrically schematic diagram of one embodiment of an automatic focussing system for a camera according to the present invention.

FIG. 1 shows the electrical schematic diagram of the automatic focussing system for a camera according to the present invention. In the FIG. 1, the part in a dotted line A is the light sensitive part for converting the light reflected from the object (not shown) to be photographed into an electrical signal, comprising a light sensitive element connected between the input terminals of the operational amplifier 3 in a certain position in a camera (not shown), resistors 5 and 7 connected in the feed back path in the amplifier 3, and a resistor 9 whose one end is connected to the junction point of the resistances 5 and 7 and whose other end is connected to a capacitor 11. Hereby, the values of the resistors 5, 7 and 9 and the capacitor 11 are chosen so as to obtain a high gain for around the signal frequency corresponding to the LED's flashing frequency and constrain the gain for the lower frequency caused by the ambient light with law frequency.

The part in a dotted line B is an amplifier circuit for amplifying the input signal, comprising a capacitor 13 constituting a high pass filter with a resistor 15 and an operational amplifier 17 having a non-inverting input terminal connected to the output terminal of the high pass filter. Further, the amplifier circuit B comprises a resistor 19 and 21 which constitute a negative feedback path of the amplifier 17, determining some gain and setting a reference level KVC for the signal.

The part in a dotted line C is a sample and hold circuit for sampling and holding the output signal of the amplifier circuit B in response to the synchronizing pulses to be explained later, comprising analog switches 23 and 25 composed of, for example, bipolar analog switches, two AND gates 27 and 29 with the output terminals connected to the control electrodes of the analog switches 23 and 25 respectively. Also, this sample and hold circuit includes resistors 31 and 33, voltage holding capacitors 35 and 37, a follower circuit 39 connected to the output terminal of the capacitor 35, a second follower circuit 41 through the resistor 43 and a resistor 47 connected to the feedback path of the amplifier 45. Hereby, the circuit composed of 43, 45 and 47 constitutes an inverter for inverting the level of the output signal of the follower circuit 41 with the gain 1 against the reference level KVC.

The part in a dotted line D is a quasi-compression circuit for amplifying the low level output signal from the sample and hold circuit C by a large gain and compressing or amplifying by a small gain the high level output signal, comprising resistors 49 and 51 for setting a reference voltage of the quasi-compression circuit D, an operational amplifier 53 having a non-inverting input terminal connected to the junction point of the resistors 49 and 51, a resistor 55 connected between the output of the amplifier 53 and the inverting input terminal, a pnp transistor 59 having an emitter connected to the output terminal of the amplifier 53 through a resistor 57 and resistors 61, 63 and 65.

The part in a dotted line E is a low pass filter connected to the output terminal of the quasi-compression circuit D, comprising a resistor 67 and a capacitor 69 connected between the resistor 67 and the ground level.

The part in a dotted line F is a peak detection prohibiting circuit which prohibits the operation of a peak detector G to be explained later when the output level of the low pass filter E is lower than a predetermined level, comprising resistors 71 and 73 for determining said predetermined level, a comparator 75 with the inverting input terminal connected to the output terminal of the voltage dividing circuit composed of the resistors 71 and 73 and the non-inverting input terminal connected to the output terminal of the low pass filter E, and a NAND gate 77.

The part in a dotted line G is the peak detector, comprising an operational amplifier 79 having a non-inverting input terminal connected to the output terminal of the low pass filter E, a diode 81 having an anode connected to the output terminal of the amplifier 79, a capacitor 85 connected to the cathode of the diode 81 through a resistor 83 and to the inverting input terminal of the amplifier 79. Also, this peak detector G includes an npn transistor 89 connected in parallel with the capacitor 85 through a resistor 87 and having a base connected to the output terminal of the NAND gate 77 through a resistor 91.

The part in a dotted line H is a driver circuit for a magnet 101 to be explained later, comprising NAND gates 93 and 95 constituting a latch circuit and an npn transistor having a base connected to the output terminal of the latch circuit through the resistance 97. 101 is a magnet operatively engaged with the distance measuring mechanism shown in FIG. 2 so as to terminate the automatic focussing operation, so designed that when the magnet 101 is de-energized the locking pawl shown in FIG. 2 stops the movement of the lens barrel shown in FIG. 2.

The part in a dotted line J includes a binary ripple counter 102 having an input terminal CK, a reset terminal $\bar{R}$ and an output terminal $\bar{Q}$.

The part in a dotted line K is a driving circuit for the LED 103, comprising a NAND gate 105, an npn transistor 109 having a base connected to the output terminal of the NAND gate 105 through a resistor 107, a resistor 111, an operational amplifier 113, a pnp transistor 115 connected to the LED 103 at its collector, a variable resistor 117 connected between the collector of the transistor 115 and the non-inverting input terminal of the amplifier 113 and a resistance 119.

The part in a dotted line L includes a NAND gate 121 having an input terminal connected to the output terminal of the comparator 75.

The part in a dotted line M is a frequency divider circuit connected to the output terminal of an oscillator circuit N to be explained later, whereby the output terminal $\bar{Q}$ of the D type Flip-Flop which forms the second stage of frequency divider M is connected to the one input terminal of the AND gate 27, while its other output terminal Q is connected to the one input terminal of the AND gate 29. The output terminal $\bar{Q}$ of the D type flip-flop circuit 127 which forms the third stage of the frequency divider M is connected to the other input terminal of the AND gate 29, and the other output terminal Q is connected to the other input terminal of the AND gate 27.

The part in a dotted line N includes an oscillator 133, whose output terminal is connected to the clock input terminals CK of the D type Flip-Flops 123 to 131.

135 is the start switch to be opened upon the initiation of the focussing operation. 137 is the switch interface circuit, 139 an AND gate having a first input terminal connected to the start switch 135 through the interface circuit 137 and a second input terminal connected to the output terminal Q of the D type Flip-Flop 131 wich forms the output terminal of the frequency divider M. 141 is the limit switch whose one end is grounded and turn to be closed state after the LED 103 has scanned the object at a predetermined distance, for example 5 (m). 145 is a NAND gate, whose one input terminal is connected to the limit switch 141 through a switch interface circuit 143 and whose other input terminal is connected to the output terminal of the peak detector circuit G. 147 is an invertor connected to the output terminal of the switch interface circuit 143.

Figure 2:
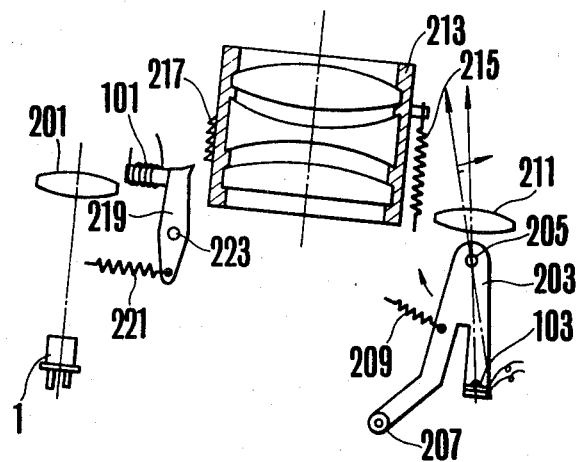
FIG. 2 shows one embodiment of essential mechanical part of the automatic focussing system in FIG. 1.

FIG. 2 shows one embodiment of an essential mechanical part of the automatic focussing system in FIG. 1, whereby 1 is a light sensitive element having the maximum sensitivity in the infra-red ray range, 201 is a light receiving lens located in front of the light sensitive element 1. A fork-shaped scanning lever 203 is moved by means of a cam (not shown). At one end of the lever 203 the LED 103 shown in FIG. 1 is secured, while at the other end a roller 207 in contact with said cam is provided. 209 is a spring for urging the scanning lever 203 along the clockwise direction, 211 a light projecting lens located in front of the LED 103, 213 a lens barrel having a taking lens optics in it, 215 a driving spring suspended on the lens barrel 213, 217 a ratchet provided on the circumference of the lens barrel 213, 219 a locking lever whose end is pawl shaped which is normally urged clockwise by means of the spring 221, 223 is the shaft for the locking lever 219 and 101 is the magnet for holding the locking lever 219 in the initial state as is shown in FIG. 2.

When the main switch (not shown) is closed, the circuitry is supplied withe power (VBAT) and the stabilized reference voltage KVC appears, wherein the start switch 135 is closed while the limit switch 141 is closed, as shown in FIG. 1.

Then, the potential at the output terminal of the switch interface 137 is low level (hereinafter descrived LL), the potential at the output terminal of the AND gate 139 is also LL, while the potential at the output terminal of the NAND gate 105 is high level (hereinafter descrived HL), whereby the transistor 109 becomes a conductive state. Thus, the transistor 115 remains in the non-conductive state, and the LED 103 for emitting infra-red ray also remains in the off state.

As is explained above, when the LED 103 does not begin to flash, there is no signal light reflected from the object (not shown) so that the light sensing circuit A produces almost no signal. As the result, the output level of the low pass filter E remains a certain D.C. level corresponding to no signal. The level of the low pass filter E at this time is lower than the output voltage of the voltage divider composed of the resistors 71 and 73 so that the output potential of the comparator 75 is LL, the outpt of the NAND gate 77 is HL. Thus, the transistor 89 is in the conductive state, the operation of the peak detector circuit G is prohibited and the output potential of the operational amplifier 79 is HL. The potential at the output terminal of the NAND gate 145 becomes LL, because the output potential of the interface circuit 143 is HL, so that the counter 102 is reset. Consequently the potential at the output terminal $\overline{Q}$ of the counter 102 becomes HL as soon as counter 102 is reset. On the other hand, the potential at the output terminal of the NAND gate 121 at this time is HL because the limit switch 141 is in the opened state. As the result, the latch circuit composed of the NAND gate 93 and 95 remains the initial state caused by the power up clear signal $\overline{PUC}$ produced with the closing of the main switch, that is, the output potential of the NAND gate 93 is kept HL and the transistor 99 remains in the conductive state and an exciting current continues to flow through the magnet 101. Consequently, the automatic focussing mechanism of the camera is held in the initial state as is shown in FIG. 2.

Figure 3:
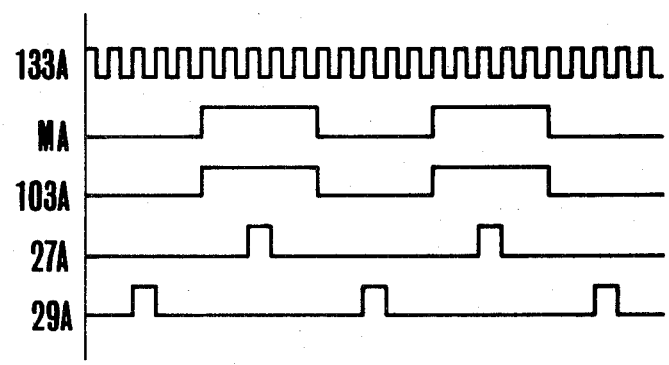
FIGS. 3 to 6 show respectively the wave-forms of the output at various points in the automatic focussing system shown in FIG. 1.

When the start switch 135 is opened in the above-mentioned state the potential at the output terminal of the interface circuit 137 turns to HL, so that the NAND gate 139 opens and closes in synchronism with the driving signal as shown with MA in FIG. 3. (Hereby, the driving signal is the output signal at the output terminal MA of the frequency divider circuit M in FIG. 1.) When the AND gate 139 opens and closes with the above mentioned timing, the NAND gate 105 opens and closes in response to the change of the potential at the output terminal of the AND gate 139, so that LED 103 flashes with the timing in synchronism with the opening and the closing of the AND gate 139 as is shown with 103A in FIG. 3, because the one input terminal of the NAND gate 105 is HL in response with the power up clear signal $\overline{PUC}$.

On the other hand, in synchronism with the opening of the start switch 135 the scanning lever 203 shown in FIG. 2 starts to move clockwise, whereby the LED 103 scans the object, while the lens barrel 213 begins to move backward by means of the spring 215, a little later than the start of the scanning of the LED 103, toward the position corresponding to the infinity. Then, the light beam emitted from the LED 103 during the scanning is reflected from the object (not shown) and is incident upon the light sensitive element 1 of the light sensing circuit A through the light receiving lens 201 shown in FIG. 2, whereby at the output terminal 3A of the light sensing circuit A, the signal whose envelope is gradually raising and falling as is shown in FIG. 4, 3A appears after low frequency components caused by the light of the sun, fluorescent lamps and so on is constrained by the feedback network in the light sensing circuit A.

Next, the amplifier circuit B eliminates DC and low frequency components included in the signal appearing at the terminal 3A and amplifies the frequency component around the flashing frequency of the LED 103.

Figure 4:
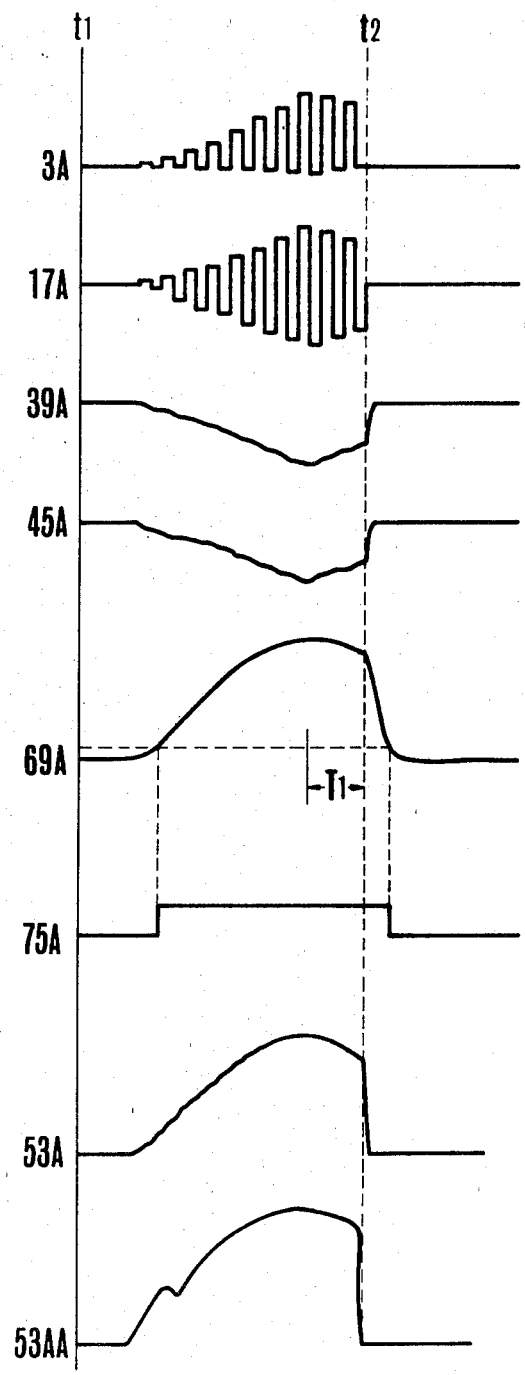

The output signal of this amplifier circuit B whose waveform is shown in FIG. 4 as 17A is applied to the input terminals of the following analog switches 23 and 25. On the other hand, a synchronizing pulses as is shown with 29A in FIG. 3 is applied from the frequency divider circuit M through the AND gate 29 to the control signal of the analog switch 23, while to the input terminal of the control signal of the analog switch 25 a synchronizing pulses as is shown with 27A in FIG. 3 is applied from the frequency divider circuit M through the AND gate 27 so that the above signals applied to the input terminals of the analog switches 23 and 25 are respectively samples by means of the analog switches 23 and 25 and held by means of the hold circuit in the following step. In consequence, at the output terminal 39A of the follower circuit 39 a signal with the wave form as is shown with 39A in FIG. 4 appears in response to the scanning of the above mentioned LED 103, while at the output terminal 45A of the invertor 45 a signal with the wave form as is shown with 45A in FIG. 4 appears in response to the scanning of the above mentioned LED 103.

At the output terminals 39A and 45A of the sample and hold circuit C, such output signals as explained above appear in response to the scanning of the LED 103, whereby, so long as the transistor 59 is in the cut off state, the output appearing at the output terminal 39A is amplified with a gain of $-55R/61R$ (hereby 55R representing the value of the resistor 55, while 61R representing the value of the resistor 61) while the output signal appearing at the output terminal 45A is amplified with a gain of $-55R/63R$ (hereby 63R representing the value of the resistor 63) in such a manner that sum of both amplified input signals appear at the output terminal 53A of the quasi-compression circuit D.

When the input level to the quasi-compression circuit D increases gradually as is shown with 39A or 45A in FIG. 4, and the level at the output terminal 53A of the amplifier 53 becomes higher than that at which the base-emitter of the transistor 59 begin to conduct, the output current of the amplifier 53 begins to flow not only through the resistor 55 but also the resistor 57 as well as the emitter and the collector which are the main electrodes of the transistor 59, so that the output of the operational amplifier 53 is gradually compressed as is shown with 53A in FIG. 4 when the level of the input signal to the quasi-compression circuit D becomes higher than a predetermined value. Hereby, the extent of the compression can be adjusted by selecting the ratio of the value of the resistor 57 to that of the resistor 55.

In the signals appearing at the output terminal 53A of the quasi-compression circuit D, the noise which is not synchronized to the sampling frequency and a high frequency noise caused by the synchronizing pulses are eliminated by means of the low pass filter E, so that the signals such as is shown with 69A in FIG. 4 are applied to the non-inverting input terminal of the amplifier 79, which is the input terminal of the peak detector circuit G.

When then the level of the output signal of the low pass filter E is lower than the divided voltage from the voltage divider circuit, the potential at the output terminal 75A of the comparator 75 remains in LL as is shown with 75A in FIG. 4, so that the level of the output of the NAND gate 77 remains HL and the transistor 89 remains the conductive state at this time point even though in synchronism with the opening of the start switch 135 the level at the input terminal 77a of the NAND gate 77 has been turned into HL. When the potential of the output of the low pass filter E becomes higher than the divided voltage from the voltage divider circuit with the proceeding of LED scanning, the potential at the output terminal 75A of the comparator 75 turns quickly out of the LL into the HL as is shown with 75A in FIG. 4. Thus the transistor 89 becomes non-conductive, whereby the peak detecting operation of the peak detector circuit G is enabled.

After the peak detector circuit G is enabled, the potential of the inverting input increases along with the increase of the low pass filter output by charging the capacitor 85 through the resistor 83 and the diode 81. Then the potential at the output terminal 79A of the amplifier 79 goes up and continues to be logical HL. However, when the output level of the low pass filter E begins to decrease as is shown with 69A in FIG. 4, the capacitor 85 holds the peak value of the input signal because the stored charge in the capacitor cannot be discharged through any path. Consequently, the feed back path of the operational amplifier 79 is interrupted, whereby the difference between the potential at the non-inverting input terminal and that at the inverting input terminal is amplified with a very large amplification corresponding to the open loop gain of the amplifier 79 in such a manner that the potential at the output terminal 79A of the amplifier 79 momentaneously goes down to LL.

Namely, the potential at the output terminal 79A of the amplifier 79 goes down to LL as soon as the light beam from the LED 103 has crossed the object which exists at a certain position. On the other hand at this time point, the limit switch 141 remains in the opened state while the potential at the one input terminal of the NAND gate 145 is HL, so that the output potential of the NAND gate 145 turns out of LL into HL in such a manner that the reset state of the counter 102 is released, and the counter 102 starts to count the pulses supplied from the frequency divider circuit M through the AND gate 139.

When the output of the peak detector circuit G is lowered to the LL not by means of the noise but by means of the scanning of the LED 103 and not by means of the noise, the lowered state is maintained for a predetermined time. Consequently, the counter 102 continues its counting operation until the predetermined time is over. Then the potential at the output terminal Q of the counter 102 turns out of HL into LL so as to reset the latch circuit, whereby the output potential of the NAND gate 93 turns out of HL into LL so as to invert the transistor 99 into the non-conductive state. Thus the magnet 101 is de-energized, whereby the locking lever 219 is rotated counter-clockwise by means of the spring 221 so as to be engaged with the ratchet 217, so that the taking lens barrel 213 stops at a proper position corresponding to that of the object. When the output potential of the NAND gate 93 turns out of HL into LL, the output potential of the NAND gate 105 turns into HL so that the LED 103 is completely put out so as to stop the automatic focusing operation.

On the other hand, this automatic focusing system described above can detect the true signal peak even when the low pass filter output includes a false peak caused by noises. Supposed that the output of the peak detector circuit G is lowered in response to the false peak and the counter 102 begins to count, this counting operation is reset by means of the repeated HL of the peak detector output so long as the level at the non-inverting input of the amplifier 79 becomes higher than the holded level at the inverting input within the predetermined time interval (as is shown with 53AA in FIG. 4). In addition, this cancelling operation for the false peak within the predetermined time interval (not so long) can be sufficiently expected when the input signal is higher than the predetermined level of the peak detection prohibiting circuit F and is gradually rising.

As can be seen, the automatic focussing operation for the object which lies at a distance before the limit switch 141 is closed has been explained.

(B) For an object in the neighborhood of the distance measuring limit.

Figure 5:
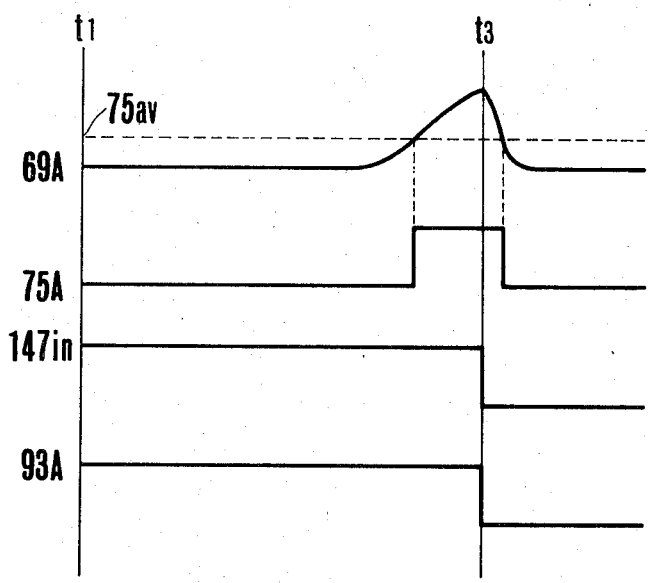

In such a case, in the same way as the above mentioned case, a signal as is shown with 69A in FIG. 5 appears at the output terminal 69A of the low pass filter E in response to the scanning of the LED 103. Hereby, it goes without saying that the object in this case is located at a distance longer than that in the above mentioned case, so that the level of the output signal of the low pass filter E is low in comparison with the above mentioned case. However, the quasi-compression circuit D amplifies the input signal of the low level with the high gain as previously mentioned, so that the output signal of the low pass filter E is enough for the following step to process.

When the light beam of the LED 103 begins to illuminate the object and the potential at the one input terminal 69A of the comparator 75 becomes higher than that at the another input terminal 75a, the potential at the output terminal 75A of the comparator 75 turns into HL in the same way as the above mentioned case, while the potential at the first input terminal 121a of the NAND gate 121 also turns into HL.

When the beam of the LED 103 continues the scanning, the output of the low pass filter E also gradually goes up as is shown with 69A in FIG. 5, whereby the limit switch 141 turns out of the opened state into the closed state at the time point $t_3$ (in FIG. 5) so that the potential at the input terminal of the invertor 147 turns out of HL into LL as is shown with 147 in FIG. 5 and the potential at the second input terminal of the NAND gate 121 turns out of LL into HL. Thus, in response to the closing of the limit switch 141, the output potential of the NAND gate 121 turns out of HL into LL, and the output potential of the NAND gate 93 turns out of HL into LL as is shown with 93A in FIG. 5 so as to de-energize the magnet 101. Consequently, the movement of the taking lens barrel 213 is forced to stop at this time point.

As described in the previous case, when the output potential of the NAND gate 93 turns out of HL into LL, the LED 103 is put out in the same way.

(C) For an object at infinity or at a longer distance than the previous two cases.

Figure 6:
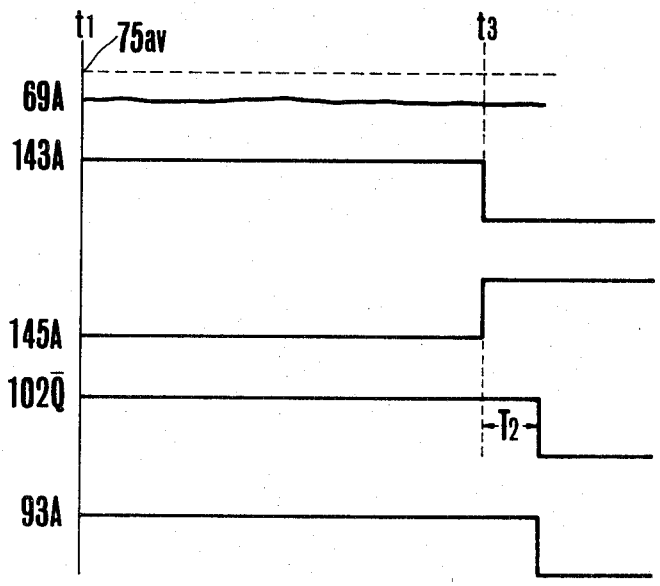

In such a case, the light reflected from the object is scarcely incident upon the light sensitive element 1, so that no signal related to the scanning of the LED 103 appears at the output terminal 69A of the low pass filter E as is shown with 69A in FIG. 6 even if the LED 103 carries out the scanning. Under the above mentioned state, the limit switch 141 is closed at the time point $t_3$, the output potential of the interface circuit 143 turns out of HL into LL as is shown with 143A in FIG. 6 and the output potential of the NAND gate 145 turns out of LL into HL as is shown with 145A in FIG. 6, so that the counter 102 begins to count. After the lapse of the time interval $T_2$, the output potential Q of the counter 102 turns out of HL into LL as is shown with 102Q in FIG. 6 and the output potential of the NAND gate 93 turns out of HL into LL as is shown with 93A in FIG. 6, whereby the taking lens barrel 213 stops moving, while the LED 103 is put out. Hence, the completion signal of the automatic focusing operation can be obtained, while power saving is carried out.

Figure 7:
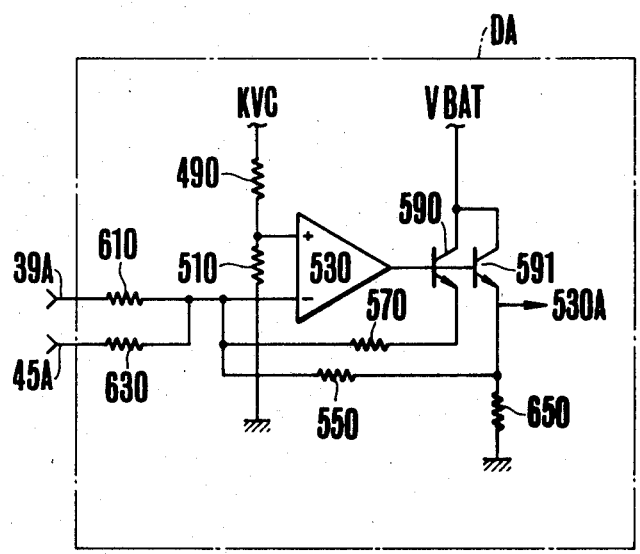
FIG. 7 shows the electrical schematic diagram of the essential part of the another embodiment according to the present invention.

FIG. 7 shows the electrical schematic diagram of the essential part of the second embodiment according to the present invention.

In this embodiment, excepting the quasi-compression circuit DA in FIG. 7, the circuitry of the first embodiment is used in common, so that only the construction as well as the operation of the quasi-compression circuit shown in FIG. 7 will be explained, omitting the explanation of the construction and the operation of other circuits, which are same as those of the first embodiment.

In FIG. 7, 610 is a resistor connected between the inverting input terminal of an operational amplifier 530 and the output terminal 39A of the follower circuit 39 shown in the first embodiment, 630 is a resistor connected between said inverting input terminal and the output terminal 45A of the follower circuit 45 of the first embodiment, 490 and 510 are resistors for constituting a voltage divider circuit whose junction point is connected to the non-inverting input of the amplifier 530, 570 is a resistor connected between the emitter of a transistor 590 and the inverting input terminal of the amplifier 530, 650 is a resistor connected to the inverting input terminal of the amplifier 530 through a resistor 550 and 591 is a transistor whose base and collector are connected respectively to those of the transistor 570 as is shown in FIG. 7 and whose emitter is grounded through said resistor 650. Hereby, the emitter of the transistor 591 is the output terminal of the quasi-compression circuit DA, to be connected to the input terminal of the low pass filter E of the first embodiment.

The operation of the quasi-compression circuit DA constructed as mentioned above is as follows.

When the level of the signal appearing at the output terminals 39A and 45A are low, the current flowing through the resistors 610 and 630 flows together almost through the resistor 550 in such a manner that the output signal amplified with (550R/610R+550R/630R) appears at the output terminal 530A. Hereby, 610R is the value of the resistor 610, 630R is the value of the resistor 630 and 550R is the value of the resistor 550. When the level of the signal applied to the inverting input terminal of the operational amplifier 530 through the resistors 610 and 630 gradually increases in the negative direction along with the scanning of the LED 103, the voltage at the output terminal 530A goes up, while the current flowing through the resistors 550 and 650 increases so that the base potential of the transistor 591 also goes up. Thus, the voltage between the base and the emitter of the transistor 590 goes up and a current through the resistor 570 increases. When the current flowing through the resistor 570 begins to increase, the gain at the amplifier 530 gradually goes down so that the potential of the output of the compression circuit DA begins to be compressed in the same way as that of the quasi-compression circuit D shown in FIG. 1.

A quasi-compression circuit according to the present invention can provide a distance measuring systemn with high accuracy for an object at a long distance as well as a short distance, by amplifying the low level signal with a high gain and by compressing or amplifying with a lower gain the high level signal automatically. Additionally, the quasi-compression circuit according to the present invention dispenses with a large high voltage supply, which is quite effective for a compact optical instruments.

What is claimed is:

1. A signal processing circuit for a distance measuring system having a light measuring circuit for converting light from an object to be measured into an electrical signal, comprising:
    (A) peak detecting means for serially comparing the electrical signal to detect a peak signal and for holding only the following peak signal having a signal level exceeding the signal level of the preceding peak, and
    (B) output means for generating the following peak signal as distance information when the following peak signal is held for a time interval longer than a predetermined time.

2. A signal processing circuit according to claim 1, wherein
    said output means includes a timer circuit connected to the peak detecting means to start its operation in response to the following peak signal and to produce a delay signal after a predetermined time, and
    means for producing the distance information as the delay signal.

3. A signal processing circuit according to claim 2, wherein
    said timer circuit comprises a counter which is released from its reset condition by the following peak signal.

4. A signal processing circuit for a distance measuring system having a light measuring circuit for converting light from an object to be measured into an electrical signal, comprising:
    (A) peak detecting means for serially comparing the electrical signal to selectively hold an output signal having a larger value, and
    (B) output means for generating the output signal having a larger value as distance information only when the electrical signal is selectively held as a largest value for a time period longer than a predetermined time.

5. A signal processing circuit according to claim 4, wherein said peak detecting means includes:
    (A) an amplifier connected to the light measuring circuit for amplifying the electrical signal from the light measuring circuit,
    (B) storing means for storing the amplified electrical signal, and
    (C) means for blocking application of the amplified electrical signal to the storing means when the level of the amplified electrical signal begins to lower and holding the amplified electrical signal just before the level lowering in the storing means.

6. A signal processing circuit according to claim 5, wherein
    said holding means includes a diode.

7. A signal processing circuit according to claim 5, wherein said storing means includes a capacitor.

8. A signal processing circuit according to claim 4, further comprising:
    prohibiting means connected to the peak detecting means to prohibit the peak detection operation of said peak detecting means when the electrical signal from the light measuring circuit is lower than a predetermined level.

9. A distance measuring system, comprising:
    light pulse emitting means for emitting pulses of light,
    variable focusing means for moving along a focusing path and focusing the light,
    sensing means for sensing the light focused by said focusing means,
    electrical means connected to said sensing means for detecting pulses corresponding to pulses of light emitted by said emitting means and for demodulating the pulses so as to produce an output which varies in response to movement of said focusing means, peak detecting means for detecting a peak in said output of said electrical means, latching means for responding to said peak detecting means for locking said focusing means in a position in response to a peak in said peak detecting means, and timing means resonsive to said peak detecting means and coupled to said latching means for inhibiting the latching means when a peak detected by said peak detecting means is followed by another peak within a predetermined time so as to eliminate the effect of the first peak.

* * * * *